United States Patent
Isozaki et al.

(10) Patent No.: US 7,632,430 B2
(45) Date of Patent: Dec. 15, 2009

(54) PROCESS FOR PRODUCING POLARIZING FILM

(75) Inventors: Takanori Isozaki, Kurashiki (JP); Tetsushi Hayashi, Kurashiki (JP); Hajime Nishiuma, Saijyo (JP)

(73) Assignee: Kuraray Co., Ltd., Kurashiki (JP)

( * ) Notice: Subject to any disclaimer, the term of this patent is extended or adjusted under 35 U.S.C. 154(b) by 239 days.

(21) Appl. No.: 10/691,573

(22) Filed: Oct. 24, 2003

(65) Prior Publication Data

US 2004/0089960 A1 May 13, 2004

(30) Foreign Application Priority Data

Oct. 31, 2002 (JP) ............................. 2002-318785

(51) Int. Cl.
*B29D 11/00* (2006.01)
(52) U.S. Cl. .................. 264/1.34; 264/2.6; 264/2.7; 264/288.4; 264/343
(58) Field of Classification Search ................ 264/1.34, 264/1.1, 1.31, 2.7, 216, 210.2, 210.3, 2.6, 264/343, 288.4
See application file for complete search history.

(56) References Cited

U.S. PATENT DOCUMENTS 4,591,512 A * 5/1986 Racich et al. ............ 427/163.1
5,326,507 A 7/1994 Starzewski
2002/0001700 A1 * 1/2002 Sanefuji et al. ............. 428/220

FOREIGN PATENT DOCUMENTS

| EP | 1 153 961 | 11/2001 |
| EP | 1 154 290 | 11/2001 |
| JP | 6-51123 | 2/1994 |
| JP | 6-337311 | 12/1994 |
| JP | 8-327823 | 12/1996 |

* cited by examiner

*Primary Examiner*—Mathieu D. Vargot
(74) *Attorney, Agent, or Firm*—Oblon, Spivak, McClelland, Maier & Neustadt, L.L.P.

(57) ABSTRACT

The invention provides a continuous method for producing polarizing films that includes a step of monoaxially stretching a polyvinyl alcohol film having a width of at least 2 m in an aqueous boric acid solution, wherein the polyvinyl alcohol film is stretched on the condition that it satisfies the following formulae (1) and (2):

$$A \geq 5 \text{ (m)} \qquad (1)$$

$$A/B \geq 0.5 \text{ (min)} \qquad (2)$$

wherein A indicates the stretching distance (m); and B indicates the stretched film speed (m/min). The method gives wide polarizing films of wide and good polarization performance, and the polarizing films thus produced are useful as the material for polarizers that may be in large-size liquid-crystal displays.

24 Claims, No Drawings

PROCESS FOR PRODUCING POLARIZING FILM

BACKGROUND OF THE INVENTION

1. Field of the Invention

The present invention relates to a method for producing polarizing films for use in liquid-crystal displays.

2. Description of the Related Art

A polarizer having the function of transmitting and blocking out light is a basic constitutive element in liquid-crystal displays (LCD), along with the liquid crystal that functions as a switch for light therein. Regarding their application field, LCDs were almost for small-sized instruments such as electronic calculators and wristwatches in the early days at the beginning of their development, but in these days, their applications are much expanding for other various instruments such as notebook-size personal computers, liquid-crystal monitors, liquid-crystal color projectors, liquid-crystal televisions, navigation systems for automobiles, personal phones, as well as measuring instruments for indoor and outdoor use, etc. Especially in liquid-crystal monitors and liquid-crystal televisions in the field of such LCD applications, bright backlights are often used, for which the polarizers are required to have better polarizing properties than those of conventional ones.

In general, polarizers are constructed by laminating a polarizing film with a protective film such as a triacetyl cellulose (TAC) film or a cellulose acetate butyrate (CAB) film, for which the polarizing film is prepared by monoaxially stretching and coloring a polyvinyl alcohol film (polyvinyl alcohol will be hereinafter abbreviated as "PVA"; and the polyvinyl alcohol film will be as "PVA film") with iodine or dichroic dye, or coloring and then monoaxially stretching it, followed by treating it with a boron compound for fixation (as the case may be, coloration and fixation may be effected at the same time).

With the development of large-sized screens in liquid-crystal monitors and liquid-crystal televisions, now required are polarizing films that are wider than conventional ones. For producing such wide polarizing films, wide PVA films enough for them must be used. However, if wide PVA films are produced by the use of the same production apparatus and under the same production condition as those for conventional PVA films, it is problematic in that the polarizing properties of the wide PVA films produced in that manner are poorer than those of ordinary PVA films.

On the other hand, liquid-crystal monitors and liquid-crystal televisions are required to enjoy more improved contrast. To meet the requirement, desired are polarizing films that have better polarizing properties than those of conventional ones. As so mentioned hereinabove, however, if wide polarizing films enough for such large-sized screens in liquid-crystal monitors and liquid-crystal televisions are produced, the polarizing properties of the wide polarizing films thus produced are not good. This means that the wide polarizing films could not meet the requirement of contrast improvement in liquid-crystal monitors and liquid-crystal televisions.

For one trial of improving the polarizing properties of polarizing films, proposed is a process of controlling the stretching condition in monoaxially stretching PVA films. For it, for example, known are a method of preparing a PVA film through casting or extrusion of a mixture of PVA, a dichroic substance and a solvent, followed by stretching it under dry heat and under a controlled condition of a ratio of the non-stretched film width ($c_0$) to the stretching gap (l), $c_0/l$ of at most 3 (JP-A 6-51123 and U.S. Pat. No. 5,326,507); a method of stretching a PVA film in an aqueous boric acid solution under a controlled condition of a ratio of the stretching distance ($a_1$) to the film width ($c_1$), $a_1/c_1$ of at least 3 (JP-A 6-337311); and a method of stretching a PVA film in an aqueous boric acid solution on such a controlled condition that the film width of the stretched film is at most 60% of that of the non-stretched film (JP-A 8-327823).

Even in these methods, however, wide PVA films could not be processed into polarizing films having good polarizing properties. At present, therefore, polarizing films known in the art are not enough for large-sized liquid-crystal displays.

An object of the invention is to provide a method for producing polarizing films having good polarizing properties by monoaxially stretching wide polyvinyl alcohol films.

SUMMARY OF THE INVENTION

We, the present inventors have assiduously studied to solve the above object, and, as a result, have found that, in a process of continuously producing polarizing films by monoaxially stretching polyvinyl alcohol films having a width of at least 2 m, when the polyvinyl alcohol films are monoaxially stretched with specifically controlling the stretching distance and the ratio of the stretching distance to the stretching speed of the films, then polarizing films having better polarizing properties than conventional ones can be obtained, and, on the basis of this finding, we have completed the present invention.

Specifically, the invention is to provide a continuous method for producing polarizing films that includes a step of monoaxially stretching a polyvinyl alcohol film having a width of at least 2 m in an aqueous boric acid solution, wherein the polyvinyl alcohol film is stretched on the condition that it satisfies the following formulae (1) and (2):

$$A \geq 5 \text{ (m)} \tag{1}$$

$$A/B \geq 0.5 \text{ (min)} \tag{2}$$

wherein A indicates the stretching distance (m); and B indicates the stretched film speed (m/min).

In producing polarizing films according to the method of the invention, when the ratio of the stretching distance (A) to the stretched film width (C), (A/C) is at least 5, then the polarizing films obtained may have better polarizing properties.

DESCRIPTION OF THE PREFERRED EMBODIMENTS

In the method of the invention, the starting PVA films having a width of at least 2 m are monoaxially stretched under the specific condition into polarizing films. Even when PVA films having a width of at least 2 m are monoaxially stretched in an ordinary manner, the polarizing properties of the polarizing films obtained in that manner are inferior to those of polarizing films having a narrower width. As opposed to it, even when PVA films having a width of 2 m or more are processed according to the method of the invention, polarizing films having significantly improved polarizing properties may be produced.

In the method of the invention, polarizing films are produced continuously. Continuously producing polarizing films as referred to herein means that starting PVA films are continuously processed into polarizing films in a process that includes multiple steps of, for example, dyeing and monoaxially stretching them. Most starting PVA films are rolled up for their storage, and like these, most polarizing films are also rolled up, after laminated with a protective film of TAC or the like, for their storage. Accordingly, one advantageous embodiment of the method of the invention comprises continuously producing a polarizing film from a rolled PVA film followed by again rolling up the thus-produced polarizing film into a roll.

In producing polarizing films according to the method of the invention, a driving roll that rotates at a low speed and a driving roll that rotates at a high speed may be used for monoaxially stretching PVA films. In this case, the PVA film take-up speed may be controlled by the use of nip rolls. When nip rolls are used, then the rotating speed of each driving roll may be the same as the moving speed of the PVA film being processed between the rolls, and therefore monoaxially stretching the PVA film may be attained by the speed difference between the low-speed driving roll and the high-speed driving roll.

In the method of the invention, the stretching distance (A) in monoaxially stretching the PVA film must be at least 5 m, preferably at least 8 m, more preferably at least 10 m, even more preferably at least 15 m. The stretching distance is preferably larger, as the polarizing properties of the polarizing films obtained may be better. However, if the stretching distance is too large, the films being processed may curl and their edges may be folded. If so, it will be difficult to apply uniform tension to the films in the cross direction of the film. Therefore, it is desirable that the stretching distance is not larger than 30 m. The stretching distance as referred to herein is meant to indicate the length of the PVA film being processed between the low-speed driving speed and the high-speed driving speed that rotates at a speed of at least 2 times that of the low-speed driving speed.

In producing polarizing films according to the method of the invention, the ratio of the stretching distance (A) to the stretched film speed (B), (A/B) must be at least 0.5 minutes, preferably at least 1.0 minute, more preferably at least 1.2 minutes. If A/B is smaller than 0.5 minutes, then the polarizing properties of the polarizing films produced will be poor and are therefore unfavorable for practical use. A/B is preferably larger, as the polarizing properties of the polarizing films produced are better. The uppermost limit of A/B varies, depending on various conditions such as the boric acid concentration of the aqueous boric acid solution to be used in monoaxial stretching and the stretching temperature, and therefore could not be indiscriminately defined. However, if A/B is too large with no meaning, the polarizing properties of the polarizing films may be bad. Therefore, it is desirable that the ratio is not larger than 3 minutes.

The stretched film speed (B) as referred to herein is meant to indicate the speed (m/min) of the PVA film that passes through the high-speed driving roll used in stretching the film.

In producing polarizing films according to the method of the invention, the ratio of the stretching distance (A) to the stretched film width (C), (A/C) is preferably at least 5, more preferably at least 7. The ratio A/C is preferably larger, as the polarizing properties of the polarizing films produced are better. However, if it is too large, then the edges of the stretched film may be too thick and the yield of the polarizing films may lower. Therefore, the uppermost limit of A/C may be about 20.

The stretched film width (C) as referred to herein is meant to indicate the width (m) of the PVA film that passes through the high-speed driving roll used in stretching the film.

PVA for use in the invention may be produced, for example, by hydrolyzing polyvinyl ester prepared through vinyl ester polymerization. Modified PVA obtained through graft copolymerization of PVA on the main chain thereof with smaller than 5 mol % of any of unsaturated carboxylic acids or their derivatives, unsaturated sulfonic acid or their derivatives, or α-olefins having from 2 to 30 carbon atoms; modified PVA obtained through hydrolysis of modified polyvinyl ester prepared by copolymerization of vinyl ester with smaller than 15 mol % of any of unsaturated carboxylic acid or their derivatives, unsaturated sulfonic acids or their derivatives, or α-olefins having from 2 to 30 carbon atoms; and polyvinylacetal resin obtained by crosslinking a part of the hydroxyl group in non-modified or modified PVA with aldehyde such as formalin, butyraldehyde or benzaldehyde are within the scope of PVA for use in the invention.

The vinyl ester includes, for example, vinyl acetate, vinyl formate, vinyl propionate, vinyl butyrate, vinyl pivalate, vinyl versatate, vinyl laurate, vinyl stearate, vinyl benzoate.

The comonomer used in producing the modified PVA for use in the invention is essentially for modifying PVA through copolymerization with it, and it may be any ene comonomer that does not interfere with the spirit of the invention. The comonomer includes, for example, olefins such as ethylene, propylene, 1-butene, isobutene; acrylic acid and its salts; acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate; methacrylic acid and its salts; methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, octadecyl methacrylate; acrylamide and its derivatives such as N-methylacrylamide, N-ethylacrylamide, N,N-dimethylacrylamide, diacetonacrylamide, acrylamidopropanesulfonic acid and its salts, acrylamidopropyldimethylamine and its salts, N-methylolacrylamide and its derivatives; methacrylamide and its derivatives such as N-methylmethacrylamide, N-ethylmethacrylamide, methacrylamidopropanesulfonic acid and its salts, methacrylamidopropyldimethylamine and its salts, N-methylolmethacrylamide and its derivatives; N-vinylamides such as N-vinylformamide, N-vinylacetamide, N-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether; nitrites such as acrylonitrile, methacrylonitrile; vinyl halides such as vinyl chloride, vinylidene chloride, vinyl fluoride, vinylidene fluoride; allyl compounds such as allyl acetate, allyl chloride; maleic acid and its salts and esters; itaconic acid and its salts and esters; vinylsilyl compounds such as vinyltrimethoxysilane; isopropenyl acetate. Of those, especially preferred are .alpha.-olefins, and more preferred is ethylene. Preferably, the degree of modification of the modified PVA for use herein is smaller than 15 mol %.

The degree of hydrolysis of PVA for use herein is preferably at least 95 mol %, more preferably at least 98 mol %, even more preferably at least 99 mol %, most preferably at least 99.5 mol % in view of the polarizing performance and the durability of the polarizing films given by it and of the polarizers given by the polarizing films.

The degree of hydrolysis of PVA is meant to indicate the ratio of the units that have been actually converted into vinyl alcohol units through hydrolysis of the polymer to those capable of being converted into vinyl alcohol units through hydrolysis thereof. The degree of hydrolysis of PVA may be measured according to the method described in JIS.

The degree of polymerization of PVA for use herein is preferably at least 1000, more preferably at least 1500, even more preferably at least 2000 in view of the polarizing performance and the durability of the polarizing films and the polarizers. The uppermost limit of the degree of polymerization of PVA is preferably at most 8000, more preferably at most 6000.

The degree of polymerization of PVA may be measured according to JIS K 6726. Concretely, PVA is re-hydrolyzed and purified, and its intrinsic viscosity in water at 30° C. is measured, from which the degree of polymerization of the polymer may be derived.

For producing PVA films for the invention from the above-mentioned PVA, for example, employable is a method of melt-extruding hydrated PVA into films. Apart from it, also employable is a method of dissolving PVA in a solvent to prepare a PVA solution followed by forming it into films through casting, wet filming (that comprises jetting the PVA solution into a bad solvent) or gel filming (that comprises once gelling the PVA solution by cooling it, followed by removing the solvent from the resulting gel through extraction to give a PVA film), or a combination of any of these. Of those, preferred are the casting method and the melt extrusion method from the viewpoint of obtaining good polarizing films.

The solvent to dissolve PVA in producing PVA films includes, for example, dimethylsulfoxide, dimethylformamide, dimethylacetamide, N-methylpyrrolidone, ethylene glycol, propylene glycol, diethylene glycol, triethylene glycol, tetraethylene glycol, trimethylolpropane, ethylenediamine, diethylenetriamine, glycerin, and water. One or more of these may be used herein. Of those, preferred is dimethylsulfoxide, water, or a mixed solvent of glycerin and water.

The ratio of PVA in the PVA solution or hydrated PVA that is used in producing PVA films for use herein may vary, depending on the degree of polymerization of PVA, but preferably falls between 20 and 70% by weight, more preferably between 25 and 60% by weight, even more preferably between 30 and 55% by weight, most preferably between 35 and 50% by weight. If the PVA concentration is higher than 70% by weight, then the viscosity of the PVA solution or hydrated PVA will be too high and the PVA liquid will be difficult to filter or defoam in preparing the film stock from it, and, as a result, PVA films with neither impurities nor defects could not be obtained. On the other hand, if the PVA concentration is smaller than 20% by weight, then the viscosity of the PVA solution or hydrated PVA will be too low, and PVA films having an intended thickness will be difficult to produce. If desired, the PVA solution or hydrated PVA may contain any of plasticizer, surfactant and dichroic dye.

In producing PVA films for use herein, a polyhydric alcohol is preferably added thereto and it serves as a plasticizer. The polyhydric alcohol includes, for example, ethylene glycol, glycerin, propylene glycol, diethylene glycol, diglycerin, triethylene glycol, tetraethylene glycol, trimethylolpropane. One or more of these polyhydric alcohols may be used herein either singly or as combined. Of those, preferred is diglycerin, ethylene glycol or glycerin in view of its effect of improving the stretchability of the PVA films formed.

The amount of the polyhydric alcohol to be added preferably falls between 1 and 30 parts by weight, more preferably between 3 and 25 parts by weight, most preferably between 5 and 20 parts by weight relative to 100 parts by weight of PVA. If it is smaller than 1 part by weight, the colorability and the stretchability of the PVA films formed will be not good; but if larger than 30 parts by weight, the PVA films formed will be too flexible and their handlability will be not good.

Preferably, surfactant is added to the system of producing the PVA films. Its type is not specifically defined, but anionic or nonionic surfactants are preferred. Preferred examples of the anionic surfactants are carboxylic acid-type anionic surfactants such as potassium laurate; sulfate ester-type ones such as octyl sulfate; and sulfonic acid-type ones such as dodecylbenzenesulfonate. Preferred examples of the nonionic surfactants are alkyl ether-type nonionic surfactants such as polyoxyethylene oleyl ether; alkylphenyl ether-type ones such as polyoxyethylene octylphenyl ether; alkyl ester-type ones such as polyoxyethylene laurate; alkylamine-type ones such as polyoxyethylene laurylaminoether; alkylamide-type ones such as polyoxyethylene laurylamide; polypropylene glycol ether-type ones such as polyoxyethylene-polyoxypropylene ether; alkanolamide-type ones such as oleyldiethanolamide; and allylphenyl ether-type ones such as polyoxyalkylene allylphenyl ether. One or more of these surfactants may be used herein either singly or as combined.

The amount of the surfactant that may be added preferably falls between 0.01 and 1 part by weight, more preferably between 0.02 and 0.5 parts by weight, most preferably between 0.05 and 0.3 parts by weight relative to 100 parts by weight of PVA. If its amount is smaller than 0.01 parts by weight, the surfactant will be ineffective for improving the film formability and releasability; but if larger than 1 part by weight, the surfactant will dissolve out of the surface of the PVA film to cause surface blocking of the film, and if so, the handlability of the film is not good.

In producing polarizing films according to the method of the invention, it is important to use PVA films having a width of at least 2 m, preferably at least 2.3 m, more preferably at least 2.6 m, even more preferably at least 3 m. If their width is smaller than 2 m, then the PVA films will significantly neck-in even to around the center part thereof while they are monoaxially stretched, and wide polarizing films of uniform optical performance can not be obtained from them. If, however, their width is larger than 6 m, the PVA films will be difficult to uniformly monoaxially stretch. Therefore, the film width is preferably at most 6 m, more preferably at most 5 m.

Preferably, the thickness of the PVA films for use herein falls between 10 and 100 µm, more preferably between 20 and 80 µm. If the PVA films are thinner than 10 µm, their mechanical strength will be too low, and therefore they could not be uniformly stretched. In addition, the polarizing films given by them will often have color mottles. On the other hand, PVA films thicker than 100 µm are also unfavorable since, their edges will readily neck in while they are monoaxially stretched to be polarizing films, and if so, the thickness of the stretched films is uneven and the color mottles in the polarizing films formed will be much emphasized The method of the invention comprises, for example, swelling a PVA film, coloring it, monoaxially stretching it in an aqueous boric acid solution, fixing it in as aqueous boric acid or potassium iodide solution and drying it, and optionally heating it. In the method of the invention, the PVA film may be monoaxially stretched in one stage or in multiple stages. In case where the PVA film is monoaxially stretched in multiple stages, at least one monoaxially-stretching stage of the multiple stages must satisfy the above-mentioned formulae (1) and (2).

The PVA films may be colored in any stage of before, during or after monoaxially stretching them. In view of the polarizing properties of the polarizing films to be given by them, the PVA films are preferably colored before they are monoaxially stretched. Dichroic dye is usable for coloring the PVA films, and its examples are iodine-potassium iodide; Direct Black 17, 19, 154; Direct Brown 44, 106, 195, 210, 223; Direct Red 2, 23, 28, 31, 37, 39, 79, 81, 240, 242, 247; Direct Blue 1, 15, 22, 78, 90, 98, 151, 168, 202, 236, 249, 270; Direct Violet 9, 12, 51, 98; Direct Green 1, 85; Direct Yellow 8, 12, 44, 86, 87; and Direct Orange 26, 39, 106, 107. One or more of these dyes may be used herein either singly or as combined. For their coloration, in general, the PVA films are dipped in a bath that contains any of the above-mentioned dyes. Apart from it, however, the dye may be in stock to give the PVA films.

In the method of the invention, PVA films must be monoaxially stretched in a hot bath of aqueous boric acid solution (if desired, the bath may contain the above-mentioned dye, or it may be for fixation mentioned below). Not specifically defined, the stretching temperature may fall between 30 and 90° C. The monoaxially-stretching draw ratio (in multi-stage monoaxial stretching, it is the overall draw ratio in all the stretching stages) is preferably at least 4 times, more preferably at least 5 times in view of the polarizing properties of the polarizing films to be produced herein and of the polarizers given by the polarizing films. The uppermost limit of the draw ratio is not specifically defined, but is preferably at most 8 times for uniformly stretching the films. After thus stretched, the thickness of the films preferably falls between 3 and 75 μm, more preferably between 5 and 50 μm.

For making them more firmly adsorb the dye applied thereto, the PVA films are generally processed for dye fixation thereon. The fixation bath in which the PVA films are processed for dye fixation thereon generally contains boric acid and/or a boron compound. If desired, the fixation bath may optionally contain an iodine compound.

Thus processed for dye fixation thereon, the PVA films are dried. Preferably, they are dried at a temperature falling between 30 and 150° C., more preferably between 50 and 150° C.

The polarizing film thus produced in the manner as above is generally laminated with a protective film of good optical transparency and mechanical strength on one or both surfaces thereof to give a polarizer for practical use. For example, the protective film may be any of triacetyl cellulose (TAC) films, cellulose acetate butyrate (CAB) films, acrylic films, polyester films, etc. The adhesive for bonding the protective film to the polarizing film may be any of polyvinyl alcohol-based adhesives, urethane-based adhesives, etc. Above all, polyvinyl alcohol-based adhesives are preferred.

Thus fabricated in the manner as above, the polarizer is coated with an acrylic adhesive or the like, and then stuck to a glass substrate to give a member of liquid-crystal display devices. When the polarizer is stuck to a glass substrate, a retardation film, a viewing angle-broadening film, a brightness-improving film and the like may also be stuck thereto.

EXAMPLES

The following Examples illustrate the present invention specifically, but do not limit the scope of the invention.

The optical performance of the polarizing films in the Examples and the Comparative Examples is measured according to the methods mentioned below.

Optical Performance of Polarizing Film:

A polarizing film sample of about 4 cm×4 cm is set in a spectrophotometer, Shimadzu's UV-2200 (equipped with an integrating sphere), and its Y value corrected for the visibility with a C light source in a viewing field of 2 degrees is measured according to JIS Z 8701. Further, the transmittance (T) of the film sample is obtained from the mean value of the data thus measured in the direction of 45 degrees and the direction of −45 degrees relative to the stretching axis direction of the film. In the same manner, the Y value of the film sample though parallel Nicol and cross Nicol is measured, and the degree of polarization (V) thereof is obtained. The dichroic ratio (Rd) of the film sample is computed according to the following formula:

$$Rd = \log(T - T \times V)/\log(T + T \times V)$$

Example 1

A roll film of polyvinyl alcohol having a degree of hydrolysis of 99.95 mol % and a degree of polymerization of 2400 (having a glycerin content of 12%, a thickness of 75 μm, a width of 3.5 m and an overall length of 2500 m) was preswollen, dyed, monoaxially stretched, fixed, dried and heated continuously in that order to produce a polarizing film. While rolled up, the polarizing film was continuously produced. Concretely, the polyvinyl alcohol film was pre-swollen by dipping it in water at 30° C. for 30 seconds, and then dipped in a solution of iodine/potassium iodide having a concentration ratio of 1/100, at 35° C. for 3 minutes. Next, this was monoaxially stretched by 6 times in the machine direction, in an aqueous 4% boric acid solution at 50° C., and the stretching distance (A) was 15 m. After thus monoaxially stretched, the film speed (B) was 10 m/min, the stretched film width (C) was 1.5 m and the thickness thereof in the center part in the cross direction was 29 μm. The film was fixed by dipping it in an aqueous solution having a potassium iodide concentration of 70 g/liter, a boric acid concentration of 40 g/liter and a zinc chloride concentration of 10 g/liter, at 30° C. for 5 minutes. With that, the film was taken out, dried in hot air at 40° C. and then heated at 100° C. The ratio of the stretching distance (A)/stretched film speed (B) was 1.5 minutes; and the ratio of the stretching distance (A)/stretched film width (C) was 10.

Thus obtained, the polarizing film had a transmittance of 43.5%, a degree of polarization of 99.99%, and a dichroic ratio of 72. Its polarizing properties were extremely good.

Example 2

A roll film of polyvinyl alcohol having a degree of hydrolysis of 99.95 mol % and a degree of polymerization of 2400 (having a glycerin content of 12%, a thickness of 75 μm, a width of 3 m and an overall length of 2500 m) was preswollen, dyed, monoaxially stretched, fixed, dried and heated continuously in that order to produce a polarizing film. While rolled up, the polarizing film was continuously produced. Concretely, the polyvinyl alcohol film was pre-swollen by dipping it in water at 30° C. for 30 seconds, and then dipped in a solution of iodine/potassium iodide having a concentration ratio of 1/100, at 35° C. for 3 minutes. Next, this was monoaxially stretched by 5.5 times in the machine direction, in an aqueous 4% boric acid solution at 50° C., and the stretching distance (A) was 10 m. After thus monoaxially stretched, the film speed (B) was 8.3 m/min, the stretched film width (C) was 1.5 m and the thickness thereof in the center part in the cross direction was 27 μm. The film was fixed by dipping it in an aqueous solution having a potassium iodide concentration of 60 g/liter, a boric acid concentration of 40 g/liter and a zinc chloride concentration of 10 g/liter, at 30° C. for 5 minutes. With that, the film was taken out, dried in hot air at 40° C. and then heated at 100° C. The ratio of the stretching distance (A)/stretched film speed (B) was 1.2 minutes; and the ratio of the stretching distance (A)/stretched film width (C) was 6.7.

Thus obtained, the polarizing film had a transmittance of 43.5%, a degree of polarization of 99.98%, and a dichroic ratio of 67. Its polarizing properties were extremely good.

Example 3

A roll film of polyvinyl alcohol having a degree of hydrolysis of 99.95 mol % and a degree of polymerization of 2400 (having a glycerin content of 12%, a thickness of 75 μm, a width of 3 m and an overall length of 2500 m) was pre-swollen, dyed, monoaxially stretched, fixed, dried and heated continuously in that order to produce a polarizing film. While rolled up, the polarizing film was continuously produced. Concretely, the polyvinyl alcohol film was pre-swollen by dipping it in water at 30° C. for 30 seconds, and then dipped in a solution of iodine/potassium iodide having a concentration ratio of 1/100, at 35° C. for 3 minutes. Next, this was monoaxially stretched by 5.5 times in the machine direction, in an aqueous 4% boric acid solution at 50° C., and the stretching distance (A) was 8 m. After thus monoaxially stretched, the film speed (B) was 8 m/min, the stretched film width (C) was 1.5 m and the thickness thereof in the center part in the cross direction was 27 μm. The film was fixed by dipping it in an aqueous solution having a potassium iodide concentration of 50 g/liter, a boric acid concentration of 40 g/liter and a zinc chloride concentration of 10 g/liter, at 30° C. for 5 minutes. With that, the film was taken out, dried in hot air at 40° C. and then heated at 100° C. The ratio of the stretching distance (A)/stretched film speed (B) was 1.0 minute; and the ratio of the stretching distance (A)/stretched film width (C) was 5.3.

Thus obtained, the polarizing film had a transmittance of 43.5%, a degree of polarization of 99.97%, and a dichroic ratio of 64. Its polarizing properties were extremely good.

Example 4

A roll film of polyvinyl alcohol having a degree of hydrolysis of 99.95 mol % and a degree of polymerization of 2400 (having a glycerin content of 12%, a thickness of 75 μm, a width of 3 m and an overall length of 2500 m) was pre-swollen, dyed, monoaxially stretched, fixed, dried and heated continuously in that order to produce a polarizing film. While rolled up, the polarizing film was continuously produced. Concretely, the polyvinyl alcohol film was pre-swollen by dipping it in water at 30° C. for 30 seconds, and then dipped in a solution of iodine/potassium iodide having a concentration ratio of 1/100, at 35° C. for 3 minutes. Next, this was monoaxially stretched by 5.5 times in the machine direction, in an aqueous 2% boric acid solution at 55° C., and the stretching distance (A) was 8 m. After thus monoaxially stretched, the film speed (B) was 8 m/min, the stretched film width (C) was 2 m and the thickness thereof in the center part in the cross direction was 20 μm. The film was fixed by dipping it in an aqueous solution having a potassium iodide concentration of 50 g/liter, a boric acid concentration of 40 g/liter and a zinc chloride concentration of 10 g/liter, at 30° C. for 5 minutes. With that, the film was taken out, dried in hot air at 40° C. and then heated at 100° C. The ratio of the stretching distance (A)/stretched film speed (B) was 1.0 minute; and the ratio of the stretching distance (A)/stretched film width (C) was 4.

Thus obtained, the polarizing film had a transmittance of 43.5%, a degree of polarization of 99.99%, and a dichroic ratio of 55. Its polarizing properties were extremely good.

Comparative Example 1

A roll film of polyvinyl alcohol having a degree of hydrolysis of 99.95 mol % and a degree of polymerization of 2400 (having a glycerin content of 12%, a thickness of 75 μm, a width of 3 m and an overall length of 2500 m) was pre-swollen, dyed, monoaxially stretched, fixed, dried and heated continuously in that order to produce a polarizing film. While rolled up, the polarizing film was continuously produced. Concretely, the polyvinyl alcohol film was pre-swollen by dipping it in water at 30° C. for 30 seconds, and then dipped in a solution of iodine/potassium iodide having a concentration ratio of 1/100, at 35° C. for 3 minutes. Next, this was monoaxially stretched by 6 times in the machine direction, in an aqueous 4% boric acid solution at 50° C., and the stretching distance (A) was 15 m. After thus monoaxially stretched, the film speed (B) was 38 m/min, the stretched film width (C) was 1.2 m and the thickness thereof in the center part in the cross direction was 31 μm. The film was fixed by dipping it in an aqueous solution having a potassium iodide concentration of 40 g/liter, a boric acid concentration of 40 g/liter and a zinc chloride concentration of 10 g/liter, at 30° C. for 5 minutes. With that, the film was taken out, dried in hot air at 40° C. and then heated at 100° C. The ratio of the stretching distance (A)/stretched film speed (B) was 0.4; and the ratio of the stretching distance (A)/stretched film width (C) was 12.5.

Thus obtained, the polarizing film had a transmittance of 43.5%, a degree of polarization of 99.8%, and a dichroic ratio of 50. Its polarizing properties were not enough for liquid-crystal displays for televisions.

Comparative Example 2

A roll film of polyvinyl alcohol having a degree of hydrolysis of 99.95 mol % and a degree of polymerization of 2400 (having a glycerin content of 12%, a thickness of 75 μm, a width of 3 m and an overall length of 2500 m) was pre-swollen, dyed, monoaxially stretched, fixed, dried and heated continuously in that order to produce a polarizing film. While rolled up, the polarizing film was continuously produced. Concretely, the polyvinyl alcohol film was pre-swollen by dipping it in water at 30° C. for 30 seconds, and then dipped in a solution of iodine/potassium iodide having a concentration ratio of 1/100, at 35° C. for 3 minutes. Next, this was monoaxially stretched by 5.5 times in the machine direction, in an aqueous 4% boric acid solution at 50° C., and the stretching distance (A) was 4 m. After thus monoaxially stretched, the film speed (B) was 2.7 m/min, the stretched film width (C) was 1.5 m and the thickness thereof in the center part in the cross direction was 27 μm. The film was fixed by dipping it in an aqueous solution having a potassium iodide concentration of 40 g/liter, a boric acid concentration of 40 g/liter and a zinc chloride concentration of 10 g/liter, at 30° C. for 5 minutes. With that, the film was taken out, dried in hot air at 40° C. and then heated at 100° C. The ratio of the stretching distance (A)/stretched film speed (B) was 1.5; and the ratio of the stretching distance (A)/stretched film width (C) was 2.7.

Thus obtained, the polarizing film had a transmittance of 43.5%, a degree of polarization of 99.7%, and a dichroic ratio of 47.2. Its polarizing properties were not enough for liquid-crystal displays for televisions.

According to the method of the invention, it is possible to produce polarizing films of good polarization performance even from wide polyvinyl alcohol films, and the polarizing films thus produced are useful as the material for polarizers that may be in large-size liquid-crystal displays.

Although the invention has been fully described in connection with the preferred embodiments thereof, those skilled in the art will readily conceive of numerous changes and modifications within the framework of obviousness upon the reading of the specification herein presented of the invention. Accordingly, such changes and modifications are, unless they depart from the scope of the invention as delivered from the claimed annexed thereto, to be construed as included therein.

What is claimed is:

1. A continuous method for producing polarizing films, which comprises:

monoaxially stretching a polyvinyl alcohol film having a width of at least 2 m in an aqueous boric acid solution, such that the polyvinyl alcohol film is drawn to a draw ratio of at least 5 times, and the polyvinyl alcohol film is stretched based on the following conditions:

$$A \geq 5 \text{ (m)} \quad (1)$$

$$3 \geq A/B \geq 0.5 \text{ (min)} \quad (2)$$

$$A/C \geq 5 \quad (3)$$

wherein A indicates the stretching distance (m), B indicates the stretched film speed (m/min), and C is the stretched film width (m), wherein the resultant polarized film has a degree of polarization of at least 99.97% and a dichroic ratio of at least 64.

2. The method for producing polarizing films as claimed in claim 1, wherein the ratio (A/B) of the stretching distance (A) to the stretched film speed (B) is at least 1.0 (minute).

3. The method for producing polarizing films as claimed in claim 1, wherein the temperature of the aqueous boric acid solution ranges from 30 and 90° C.

4. The method for producing polarizing films as claimed in claim 1, wherein the polarizing films are produced by a series of steps of swelling a polyvinyl alcohol film, dyeing the film, monoaxially stretching the polyvinyl alcohol film in an aqueous boric acid solution, fixing the film, and drying the film.

5. The method for producing polarizing films as claimed in claim 1, wherein the polyvinyl alcohol has a degree of hydrolysis of at least 95 mol %.

6. The method for producing polarizing films as claimed in claim 5, wherein the polyvinyl alcohol has a degree of hydrolysis of at least 98 mol %.

7. The method for producing polarizing films as claimed in claim 6, wherein the polyvinyl alcohol has a degree of hydrolysis of at least 99 mol %.

8. The method for producing polarizing films as claimed in claim 7, wherein the polyvinyl alcohol has a degree of hydrolysis of at least 99.5 mol %.

9. The method for producing polarizing films as claimed in claim 1, wherein the polyvinyl alcohol has a degree of polymerization of at least 1000.

10. The method for producing polarizing films as claimed in claim 9, wherein the polyvinyl alcohol has a degree of polymerization of at least 1500.

11. The method for producing polarizing films as claimed in claim 10, wherein the polyvinyl alcohol has a degree of polymerization of at least 2000.

12. The method for producing polarizing films as claimed in claim 1, wherein the polyvinyl alcohol film has a thickness ranging from 10 to 100 μm.

13. The method for producing polarizing films as claimed in claim 1, wherein the polyvinyl alcohol film contains a polyhydric alcohol serving as a plasticizer.

14. The method for producing polarizing films as claimed in claim 1, wherein the polyvinyl alcohol film contains an anionic or nonionic surfactant.

15. A continuous method for producing polarizing films, which comprises:

swelling a polyvinyl alcohol film;
coloring the polyvinyl alcohol film;
monoaxially stretching the polyvinyl alcohol film having a width of at least 2 m in an aqueous boric acid solution, such that the polyvinyl alcohol film is drawn to a draw ratio of at least 5 times, and the polyvinyl alcohol film is stretched based on the following conditions:

$$A \geq 5 \text{ (m)} \quad (1)$$

$$3 \geq A/B \geq 0.5 \text{ (min)} \quad (2)$$

$$A/C \geq 5 \quad (3)$$

wherein A indicates the stretching distance (m), B indicates the stretched film speed (m/min), and C is the stretched film width (m), fixing the stretched film in an aqueous boric acid or potassium iodide solution; and drying the colored film, wherein the resultant polarized film has a degree of polarization of at least 99.97% and a dichroic ratio of at least 64.

16. The method for producing polarizing films as claimed in claim 15, additionally comprising heating the colored film following drying the colored film.

17. The method for producing polarizing films as claimed in claim 1, wherein the ratio of the stretching distance (A) to the stretched film width (C), (A/C) is at least 10.

18. The method for producing polarizing films as claimed in claim 1, wherein $$1.5 \geq A/B \geq 0.5 \text{ (min)} \quad (2)$$

$$A/C \geq 6.7 \quad (3).$$

19. The method for producing polarizing films as claimed in claim 15, wherein $$1.5 \geq A/B \geq 0.5 \text{ (min)} \quad (2)$$

$$A/C \geq 6.7 \quad (3).$$

20. The method for producing polarizing films as claimed in claim 16, wherein $$1.5 \geq A/B \geq 0.5 \text{ (min)} \quad (2)$$

$$A/C \geq 6.7 \quad (3).$$

21. The method for producing polarizing films as claimed in claim 1, wherein A is at least 8 m.

22. The method for producing polarizing films as claimed in claim 1, wherein A is at least 10 m.

23. The method for producing polarizing films as claimed in claim 1, wherein A is at least 15 m.

24. The method for producing polarizing films as claimed in claim 1, wherein B is at least 8 m/min and C is at least 1.5 m.

* * * * *